Feb. 26, 1924.    1,484,618
R. BLADES
SKINNING KNIFE
Filed April 12, 1922
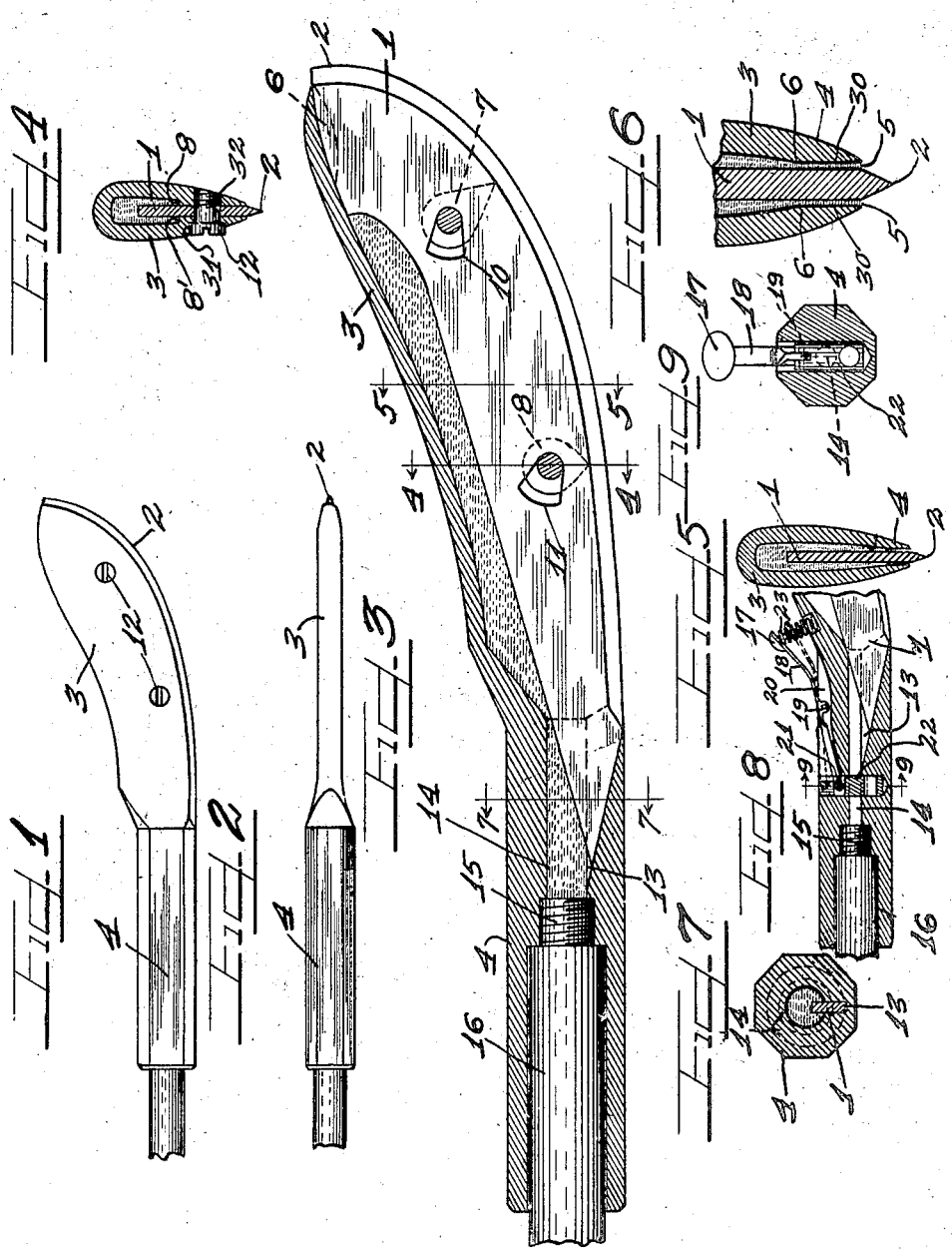

Patented Feb. 26, 1924.

1,484,618

UNITED STATES PATENT OFFICE.

ROBERT BLADES, OF CHICAGO, ILLINOIS.

SKINNING KNIFE.

Application filed April 12, 1922. Serial No. 551,926.

*To all whom it may concern:*

Be it known that I, ROBERT BLADES, a citizen of the United States, and a resident of the city of Chicago, in county of Cook and State of Illinois, have invented certain new and useful Improvements in a Skinning Knife; and I do hereby declare that the following is a full, clear, and exact description of the same, reference being had to the accompanying drawings, and to the numerals of reference marked thereon, which form a part of this specification.

This invention relates to a knife such as is used in removing the skin from the carcass in butchering operations.

It is an object of this invention to provide a knife with a continuous supply of water or air under pressure.

It is a further object of this invention to supply the fluid under pressure along the whole edge of the knife.

It is a further object of this invention to provide a knife with means for supplying water or air under pressure along the whole cutting edge without materially changing the shape of the tool from that with which the workman is already familiar.

It is a further object of this invention to provide means for positioning a knife blade within a housing so that the edge of the blade shall project from the housing.

It is a further object of this invention to provide convenient means for adjusting the blade as the knife edge is worn away.

It is a further object of this invention to provide means for conveniently controlling the flow of fluid to the knife.

Other and further important objects of the invention will be apparent from the disclosures in the drawing and specification.

The invention (in a preferred form) is shown on the drawings and hereinafter more fully described.

On the drawings:

Figure 1 is a side view of a knife with the invention applied thereto.

Figure 2 is a view of the back edge thereof.

Figure 3 is a longitudinal section.

Figure 4 is a section on the line 4—4 of Figure 3.

Figure 5 is a section on the line 5—5 of Figure 3.

Figure 6 is an enlarged view of the portion of Figure 5 showing the cutting edge.

Figure 7 is a section upon the line 7—7 of Figure 3.

Figure 8 is a longitudinal section showing a modification.

Figure 9 is a section upon the line 9—9 of Figure 8.

As shown on the drawings:

The knife blade 1 has a cutting edge 2 which projects from a housing 3. This housing is of a general U-shape in cross section, extends the whole length of the blade, and merges into a handle portion 4. Along the blade the sides of the housing come nearly to the cutting edge 2. For the greater part of their width the sides are nearly parallel but toward the cutting edge they converge as shown at 4 so that they leave a very narrow slot 5 between the edges 30 of the sides and the knife blade. Preferably the taper shown at 4 is very gradual and merges very gradually with the parallel portions of the side walls of the housing.

The interior surface of these walls is approximately parallel to the exterior surface until the slot 5 is reached, and then beginning from the points 6 the interior surface of each wall constitutes an edge 30 of the wall and forms one side of the slot 5 between the wall and the blade and is parallel to the blade. The edges 30 of the side walls extending from the points 6 to the ends of the slots 5 define a slot in the housing which is somewhat wider than the thickness of the blade so that when the blade is maintained in the center of this slot two narrow slots 5 result. In order to thus position the blade 1, lugs are provided as shown at 6, 7 and 8 in Figure 3. At each of these three places there is a pair of lugs, one lug against each side wall of the housing, as is illustrated in Figure 4 by the lugs 8 and 8'.

The knife is provided with a pair of openings or slots 10 and 11 adjacent the lugs 7 and 8, and screws 12 are provided to go through these slots or holes into the lugs and so hold the knife blade in place. For the reception of these screws one side wall of the casing or housing is recessed as shown at 31 to receive the head of the screw, and the other side wall is provided with a threaded hole 32 to receive the other end of the screw as shown in Figure 4.

For the reception of the screw in the lugs the ends of the lugs nearest the screw are made larger, but the ends of the lugs toward the cutting edge of the knife are reduced to mere points, as may be seen at 7 and 8 in Figure 3. Thus the butt ends of the lugs afford an ample bearing surface against the sides of the knife, but the front or pointed ends of them are small enough to offer no substantial obstacle to the flow of liquid or air.

The lug 6 coming at the very end of the knife will not materially interfere with the flow of fluid to its edge. Therefore, this lug is made of any desired shape and need not be pointed. As illustrated, the lug is made to taper to the end of the casing so that it is possible for water to flow clear to the very end of the knife edge 2. The end of the blade toward the handle 4 fits into notch 13 having a tapering depth, the sides of which afford an additional bearing for the blade. Thus the blade is supported at four points on each face.

A conduit 14 extends through the handle 4 of the tool and is threaded for the reception of a nipple 15 on the end of a pipe, which, in order that the knife may be readily manipulated in its use, is preferably a flexible hose.

In the form illustrated in Figure 3, the flow through the hose 16 and conduit 14 into the housing 3 will be controlled at any desired point, for example, by a valve controlled by the workman's foot.

In the form shown in Figure 8, a handle 17 is provided for operation by the workman's thumb, and it is placed adjacent the junction of the casing 3 with the handle 4 in order that it may be conveniently located for such manipulation. This handle is at one end of a lever 18 pivoted at 19 in a recess 20 formed for its reception in the handle 4. The other end of the lever 19 has a pin and slot connection as shown at 21 with a slide valve 22, which, in the position illustrated in Figure 8, closes the passage 14; but in the position it will assume when the handle 17 is pressed, the opening in the slide valve will come opposite the passage 14 and leave it free for the passage of water or air. The spring 23 located under the handle 17 serves to return the valve to closed position when the pressure on the handle is removed.

In assembling the device, the blade 1 is passed through the slots between the edges 6 of the housing 3 and is guided into position by the lugs 6, 7, and 8, and the slot 13. The beveled bottom of the slot 13 and the curved end of the housing adjacent the lug 6 serve to quickly bring the blade to the correct position with the holes 10 and 11 opposite the holes for the screws 12. These screws are next inserted. The blade is then placed so that a cutting edge 2 projects to the correct extent and then the screws 12 are tightened. The U-shaped character of the cross section of the housing 3 gives the casing sufficient resiliency to enable the screws to be tightened enough to cause the lugs 7 and 8 to clasp the sides of the knife with sufficient friction to hold it permanently in the selected position. The hose 16 is then introduced through the handle end of the casing and screwed into place, the nipple 15 serving to connect the hose and the casing. The other end of the hose is then connected to a supply of water or of compressed air and the tool is ready for use.

In the use of the tool, the cutting edge 2 acts to sever the tissues connecting the skin with the carcass, and the flow of water or compressed air through the slots 5 serves to lift the skin away from the flesh so that the operator can rapidly and easily separate the skin from the flesh without being obliged to stop to pull the skin away as he cuts. The workman is also relieved from the necessity of stopping to plunge his knife in water occasionally as was the old practice. The flow of water will also keep the knife free from blood or dirt that might interfere with the accuracy and rapidity of the workman's operations.

I am aware that numerous details of construction may be varied through a wide range without departing from the principles of this invention, and I therefore do not purpose limiting the patent granted otherwise than necessitated by the prior art.

I claim as my invention:

1. A knife, a casing surrounding said knife and having a slot through which the cutting edge of the knife projects, and a connection through which fluid may be supplied to said casing.

2. In combination, a blade, a casing surrounding the back of said blade and extending over each face nearly to the cutting edge, the walls of said casing being spaced away from the blade, said space being less at the edges of the walls than over most of the sides of the knife whereby a slot is provided between the blade and the casing on each side of the cutting edge of the knife and near said edge, lugs on said walls contact said blade to maintain it in position with its cutting edge out of contact with the edges of the walls of the casing, said blade having holes adjacent said lugs, and fastening means passing through said holes into said lugs and holding said blade in said casing, a handle for said casing, and a conduit through said handle into said casing.

3. A blade, a casing therefor, lugs on said casing positioning said blade between the sides of the casing, said blade having elongated holes therein, fastening means through the lugs extending through said holes whereby the position of the blade can be adjusted within the plane determined by said lugs.

4. A blade, means for supplying fluid to the cutting edge thereof, said means including a casing surrounding the back of the blade, lugs on said casing contacting the blade, the part of the lugs toward the cutting edge being narrowed to a point.

5. A knife, a casing surrounding said knife and having a slot through which the cutting edge of the knife projects, means for supplying fluid to said casing, and a manual valve controlling said means.

6. In a skinning tool, a knife, a casing surrounding said knife and having a slot through which the cutting edge of the knife projects and a coupling for connecting said casing to a source of fluid supply.

7. In combination a hose, a knife, a casing covering said knife and a coupling connecting said casing and hose and constituting a handle for said knife.

8. In a skinning tool, a hose, a tubular handle, a knife secured to said handle, a casing covering said knife, said hose being connected to one end of said handle and said casing to the other end whereby the tube of the handle leads fluid from said hose to said casing.

In testimony whereof I have hereunto subscribed my name in the presence of two subscribing witnesses.

ROBERT BLADES.

Witnesses:
CARLTON HILL,
JAMES M. O'BRIEN.